(12) United States Patent
Solheim et al.

(10) Patent No.: US 6,308,043 B1
(45) Date of Patent: Oct. 23, 2001

(54) WIRELESS COMMUNICATION LINK QUALITY FORECASTING

(75) Inventors: Fredrick S. Solheim; Mark E. Yager, both of Boulder, CO (US)

(73) Assignee: Radiometrics Corporation, Boulder, CO (US)

( * ) Notice: Subject to any disclaimer, the term of this patent is extended or adjusted under 35 U.S.C. 154(b) by 0 days.

(21) Appl. No.: 09/121,042

(22) Filed: Jul. 23, 1998

(51) Int. Cl.$^7$ .................................................. H04B 1/10
(52) U.S. Cl. ........................... 455/63; 455/67.1; 342/351
(58) Field of Search ........................ 455/63, 67.1, 67.3, 455/67.4, 67.5, 226.1, 10, 12.1, 13.4, 427, 423, 424, 425; 375/224; 342/165, 351; 324/76.14

(56) References Cited

U.S. PATENT DOCUMENTS

| | | | |
|---|---|---|---|
| 4,633,411 | * 12/1986 | Bliss et al. ............................. | 702/77 |
| 4,789,948 | * 12/1988 | Von Der Embse .................. | 714/712 |
| 4,873,481 | * 10/1989 | Nelson et al. ....................... | 324/640 |
| 4,980,924 | * 12/1990 | Reed et al. ............................ | 455/63 |
| 5,301,127 | * 4/1994 | Hitney .................................... | 342/26 |
| 5,386,495 | * 1/1995 | Wong et al. .......................... | 375/224 |
| 5,392,314 | * 2/1995 | Wolf ...................................... | 375/224 |
| 5,526,676 | * 6/1996 | Solheim et al. .................... | 73/29.01 |
| 6,097,752 | * 8/2000 | Wiedeman et al. ................. | 375/200 |
| 6,185,470 | * 2/2001 | Pado et al. .......................... | 700/104 |

OTHER PUBLICATIONS

Mayer et al., Ka–Band Scintilations: Measurements and Model Predictions; Jun. 6, 1997; Proceedings of the IEEE; vol. 85, No. 6; pp. 936–945.

* cited by examiner

*Primary Examiner*—Nay Maung
*Assistant Examiner*—Erika A. Gary
(74) *Attorney, Agent, or Firm*—Harold A. Burdick

(57) ABSTRACT

Apparatus and method for forecasting the quality of radio communication links on a short-term basis are disclosed, the apparatus including at least one, and preferably an ensemble of, sensors providing output indicia indicative of evolving atmospheric and/or ionospheric conditions in the vicinity of a monitored communication link. The sensors may include any device that provides data containing predictive information, such as a microwave radiometer for receiving atmospheric emissions that are related to atmospheric scattering and absorption of radio propagation, input for measurement of the signal-to-noise ratio of the radio link carrier, and sensors of surface meteorology including barometric pressure, temperature, and surface winds direction and velocity. Data provided is processed utilizing mathematical inversion (also referred to as function estimation) techniques to provide predictions of changing link quality in the short-term (e.g., down to and less than 15 minutes) requiring communication link adaptation. The apparatus and methods employed are completely automated and link-site based.

26 Claims, 8 Drawing Sheets

WIRELESS COMMUNICATION LINK QUALITY FORECASTING

GOVERNMENT SUPPORT

This invention was made with U.S. Government support under contract awarded by the U.S. Air Force. The U.S. Government has certain rights in the invention.

FIELD OF THE INVENTION

This invention relates to wireless communication link quality maintenance, and, more particularly, relates to systems and methods for predicting relative degradation and/or improvement of communication link propagation.

BACKGROUND OF THE INVENTION

Wireless, or radio, communication links are increasingly used in lieu of hardwire or other hardware links in a variety of communication modes. Because of frequency allocation crowding at lower frequencies, greater bandwidth capabilities (and therefore higher data throughputs) of higher frequencies, and advancement of technologies in higher frequency wavebands and resulting decrease in cost, gigahertz frequency wavebands are now being licensed at premium fees.

However, link quality losses related to atmospheric conditions increase significantly with signal frequency. These propagation losses are increased, for example, by the presence of water vapor, clouds, and/or rain, hail, snow, or aerosols at lower altitudes, and evolving ionospheric effects at higher altitudes.

In addition to widely used earth-based microwave links and existing satellite systems (such as the MILSTAR system), a number of new satellite systems are being proposed for implementation of ground-based communications (for example, the proposed MOTOROLA IRIDIUM, TELEDESIC, and WINSTAR systems or the like) which will operate in wavebands vulnerable to atmospheric link quality losses due to weather events. Current methods of correcting for loss of radio link quality primarily rely on correction after detecting actual loss of signal. Communication disruption is thus not prevented utilizing such current methods.

What is needed is an ability to forecast the quality of the link on a short-term basis so that the likelihood of communication link disruption or loss can be anticipated and readily mitigated (utilizing known mitigation methods such as boosting transmit power, slowing data bit rate, or switching earth station sites or satellites for example) in advance of link disruption or loss.

SUMMARY OF THE INVENTION

This invention provides apparatus and methods for forecasting the quality of a wireless communications link on a short-term basis so that the likelihood of communication link disruption or significant signal loss can be anticipated and readily mitigated in advance of such disruption or loss (and return to the status quo ante anticipated and accomplished in a timely fashion thereafter). The apparatus forecasts likely wireless communication link quality changes due to atmospheric conditions and responds to a predicted quality change in sufficient time to allow communication link adaptation, the atmospheric conditions including events likely to evolve in the vicinity of the communication link in the short-term down to and less than 15 minutes from forecasting.

The short-term forecasting apparatus of this invention for predicting quality changes of a wireless communication link includes input providing indicia of selected evolving vicinal atmospheric conditions, and processing for receiving the indicia and utilizing the indicia to provide output predicting link quality change in the short-term requiring communication link adaptation (which may be no more than a warning, but which may include suggested mitigation). The input provides data that may include measured communication link attenuation and barometric measurements, surface wind measurements, air temperature measurements, and/or atmospheric microwave power emission measurements all taken in the vicinity of the communication link.

Processing receives the data and preferably includes a preprocessing stage enhancing data features of interest. A mathematical inversion system processing stage is utilized to extract prediction of short-term link quality change from the enhanced data. An output stage receives the prediction from processing and initiates a warning or communication link remediation measures when required.

In accord with another aspect of this invention, a monolithic microwave integrated circuit radiometer receiver for use with the apparatus of this invention is provided which is inexpensive and greatly simplified. The receiver includes an antenna connected with a monolithic microwave integrated circuit transceiver. The transceiver is configured with a muted transmitter and has an intermediate frequency output coupled to a detector diode. Several stages of amplification are provided between the antenna and the diode, the amplification stages providing total amplification between the antenna and the diode selected so that, in response, the diode is preferably (though not necessarily) operated in a linear portion of its voltage out vs. power. Output voltage changes at the diode are thereby found to be directly proportional to sky emission power changes received at the antenna.

The methods of this invention include the steps of receiving indicia of selected evolving vicinal atmospheric conditions, processing the indicia to derive short-term link quality change prediction based at least in part on selected utilization of past communication link performance, and utilizing the prediction remedially.

The apparatus of this invention preferably utilizes measurements from a plurality of sensors and processes resultant data to enhance desired signal and to predict change in radio link quality. The sensors can include the radio link itself, an ensemble of site-based devices for local measurements of surface meteorology, and a site-based microwave radiometer for detecting atmospheric emissions in the vicinity of the communication link. Non-locally sensed data from satellites, radar, and other sources may supplement the system.

By subjecting data to mathematical inversion technique processing (utilizing artificial neural networks (hereinafter ANN), for example), the state of the atmosphere as it relates to propagation loss in the waveband of interest may be predicted forward in time.

The apparatus of this invention is self-monitoring as to predictive capability and self-adaptive to loss or addition of a sensor and data type, sensor drift, seasonal changes, drifts in climatology, and other environmental or system changes. This is accomplished by apparatus self-training on data as received at processing.

The apparatus and methods of this invention are site-based at the communication link (e.g., at a ground base or other site in the vicinity of the link), and provide for automatic assimilation of data from sensed signals, preprocessing (if utilized) and processing to obtain predictions of wireless communication link quality. Such sensing of atmospheric signals and processing predicts improvement as well as degradation in radio propagation links.

It is therefore an object of this invention to provide apparatus and methods for forecasting the quality of a wireless communications link on a short-term basis.

It is another object of this invention to provide apparatus and methods for forecasting the quality of a wireless communications link on a short-term basis so that the likelihood of communication link disruption or significant signal loss can be anticipated and readily mitigated in advance of such disruption or loss (and return to the status quo ante anticipated and accomplished in a timely fashion thereafter)

It is still another object of this invention to provide apparatus and methods for forecasting likely wireless communication link quality changes due to atmospheric conditions, the atmospheric conditions including events likely to evolve in the vicinity of the communication link in the short-term down to and less than 15 minutes from forecasting.

It is yet another object of this invention to provide apparatus for short-term forecasting of quality changes of a wireless communication link including input for providing indicia indicative of selected evolving vicinal atmospheric conditions, and processing for receiving the indicia and utilizing the indicia to provide output predicting link quality change in the short-term requiring communication link adaptation.

It is still another object of this invention to provide apparatus for forecasting likely wireless communication link quality changes due to atmospheric conditions and responding to a predicted quality change in sufficient time to allow communication link adaptation, the atmospheric conditions including events likely to evolve in the vicinity of the communication link in the short-term down to and less than 15 minutes from forecasting, the apparatus including input means for providing data indicative of atmospheric conditions, the data including at least one of measured communication link attenuation, barometric measurements taken in the vicinity of the communication link, surface wind measurements taken in the vicinity of the communication link, air temperature measurements taken in the vicinity of the communication link, and atmospheric microwave power emission measurements taken in the vicinity of the communication link, processing means for receiving the data and including a preprocessing stage enhancing data features of interest in the data received from the input means and a mathematical inversion method processing stage to extract prediction of short-term link quality change from the enhanced data, and output means for receiving the prediction from the processing means to thereby initiate communication link remediation measures when required.

It is another object of this invention to provide a method for short-term forecasting of quality changes of a wireless communication link including the steps of receiving indicia indicative of selected evolving vicinal atmospheric conditions, processing the indicia to derive short-term link quality change prediction based at least in part on selected utilization of past communication link performance, and utilizing the prediction remedially.

It is still another object of this invention to provide a monolithic microwave integrated circuit radiometer receiver including an antenna, a monolithic microwave integrated circuit transceiver connected with the antenna and configured with a muted transmitter, the transceiver having an intermediate frequency output, a detector diode connected with the output of the transceiver, and amplification means for signal amplification at selected stages between the antenna and the diode, the amplification means providing total amplification between the antenna and the diode selected so that, in response, output voltage changes at the diode are proportional to sky emission poser changes received at the antenna.

With these and other objects in view, which will become apparent to one skilled in the art as the description proceeds, this invention resides in the novel construction, combination, arrangement of parts and method suostantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
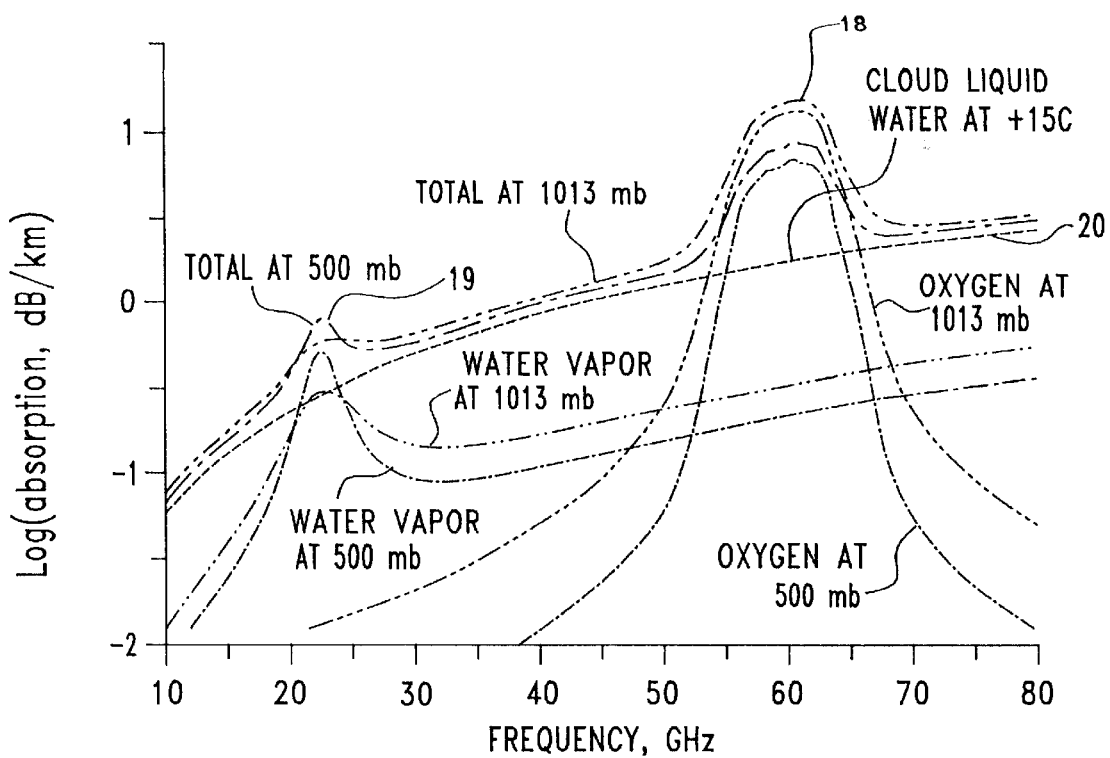
FIG. 1 graphically shows atmospheric losses due to several differing weather scenarios in the frequency range of 0 to 100 gigahertz.

This invention utilizes certain discernible atmospheric indicia (signatures in data) that are exhibited by evolving weather phenomenon. FIG. 1 graphically shows data indicative of atmospheric losses due to various atmphric constituents in several differing weather scenarios in the frequency range of 0 to 100 gigahertz. The feature 18 at 60

GHz is due to atmospheric oxygen and is always present. The feature 19 at 22.235 Ghz is due to atmospheric water vapor and is proportional to the amount of water vapor present. The losses are increased with the presence of cloud (at 20) and of rain.

Figure 2A:
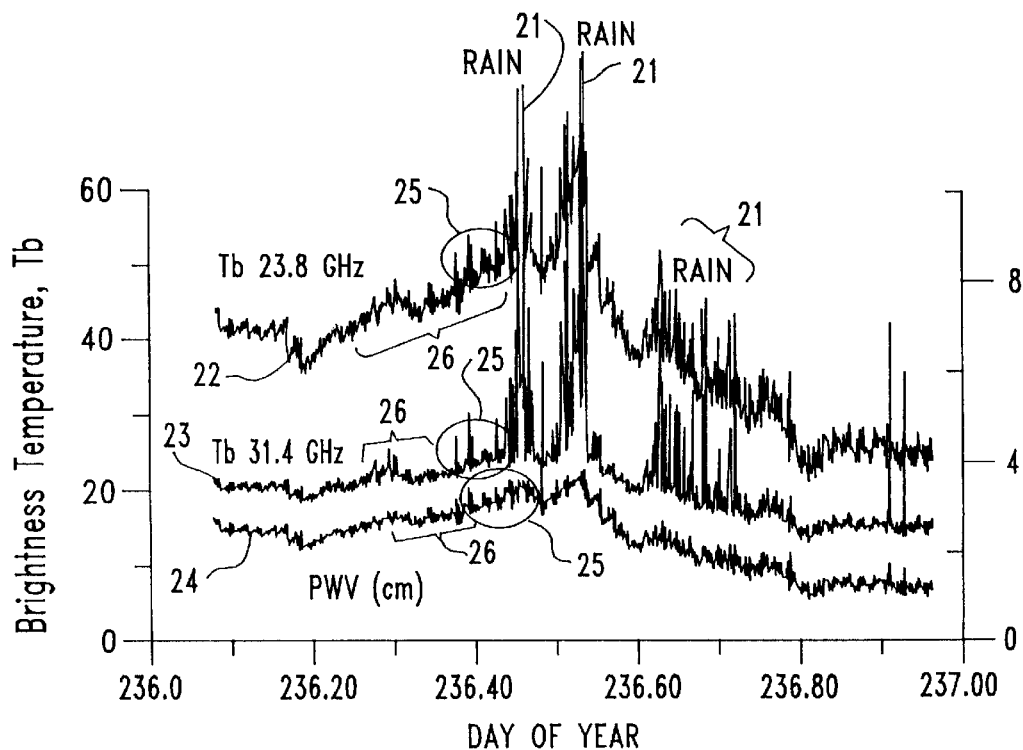
FIGS. 2a and 2b show a time series of surface barometer, temperature, and microwave radiometer measurements.
Figure 2B:
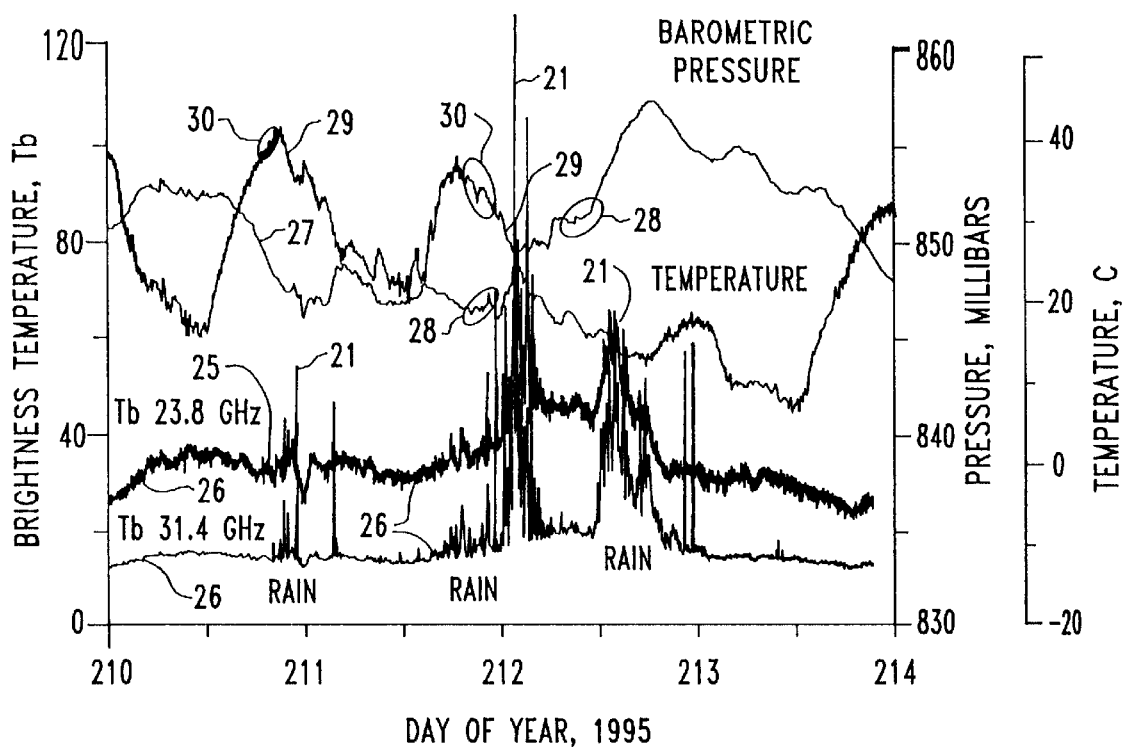

FIGS. 2a and 2b show time series of several data types (surface barometer, temperature, and microwave radiometer measurements) observed preceding, during, and after periods of high link attenuation caused by rain events 21. Time series of microwave power emitted by the atmosphere and measured by a microwave radiometer receiving at 23.8 (at 22) and 31.4 (at 23) gigahertz, and precipitable water vapor 24 for several light rain events 21 are shown in FIG. 2a. These two microwave channels are sensitive to water vapor and cloud liquid water (as is known in the prior art).

Microwave radiometers are receivers that measure power emitted by the atmosphere, and can thus remotely detect water vapor and clouds. Radiometer brightness increases with an increase in water vapor, clouds, and rain. A radiometer scanning near the horizon can detect the approach or departure of weather features, and can be utilized to forecast the occurrence of weather change. The radiometer utilized in FIG. 2a was observing sequentially in numerous directions and elevation angles around the sky (azimuthal scans preferably at a low elevation angle). When the sky is uniform in water and water vapor, the time series trace is very narrow because the same signal is seen in all directions. When a weather feature is approaching from (or departing to a certain direction, the radiometer measurements will be different from one side of the sky to the other. This causes the trace of the time series to spread in amplitude (at 25 indicating anisotropy in the sky microwave power, or brightness temperature) as measurements are made around the horizon, and trend upward (at 26), heralding the approach of a downturn in weather (from the brighter direction). Likewise, a spreading of the trace and decrease in brightness indicates a departure of cloud and water vapor and predicts subsepuent improvement in weather.

Surface barometric measurements often trend downward in advance of unstable weather (at 27 of FIG. 2b) and acquire high-frequency structure 28. The high frequency fluctuations 28 in the time series of the surface barometric pressure are due to pressure waves that propagate outward from weather features. Acoustic and buoyancy waves propagate outward from atmospheric disturbances such as frontal systems, cumulus and thunderstorm buildup, microbursts and other weather related atmospheric features, and can be remotely detected with a sensitive barometer. These barometric data can be processed for precursors to change in link quality. Additionally, trends in barometric pressure over a period of hours precede weather changes. These waves precede downturn (rain events 21) in weather (decreasing pressure) and improvement in weather (increasing pressure).

Surface temperature also changes trend 29, and often acquires high frequency structure 30 preceding weather events. Surface winds may become variable and change velocity and direction with frontal passage, thus preceding cloudiness and precipitation (not shown).

Figure 3:
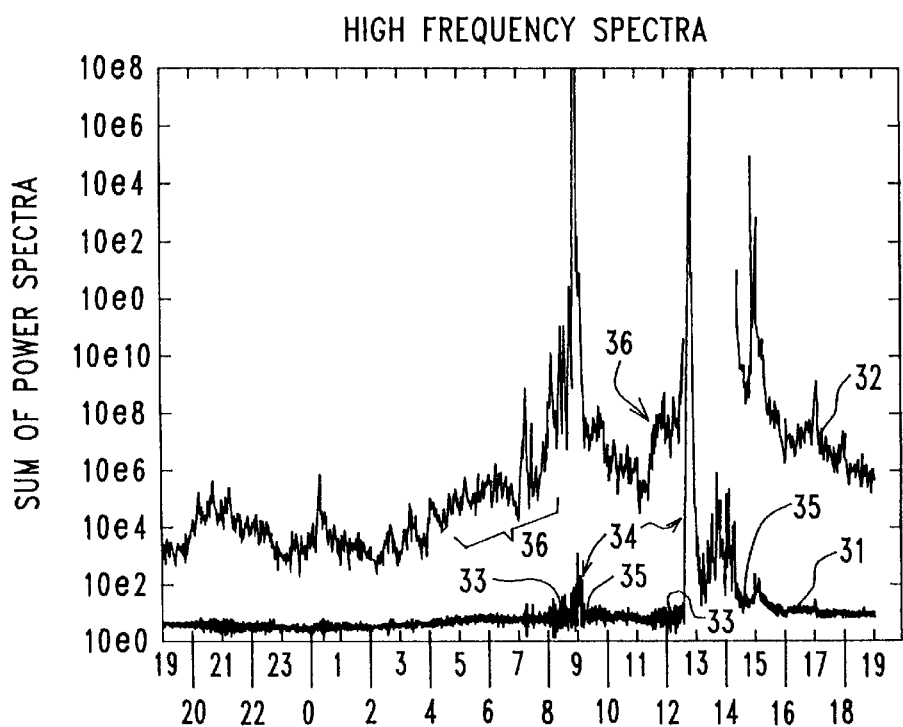
FIG. 3 shows attenuation of a 20 GHz satellite-to-earth radio carrier over a 24 hour period, and the sum of the power in the Fourier transform spectrum of the signal carrier.

FIGS. 3 through 7a–c are examples of data from various sensors and processes from a single day that illustrate how the above-identified signatures in data that are affected by weather phenomenon and data signatures in the signal carrier itself may function as predictive indicia relating to radio propagation losses and change. FIG. 3 shows attenuation of a 20 GHz satellite-to-earth radio link carrier 31 over a 24 hour period, and the sum of the power in the Fourier transform spectrum 32 of the signal carrier.

The attenuation of the radio link carrier itself also acts as a precursor to change in link quality. The radio carrier signal-to-noise ratio (broadly defined herein to include Eb/No for digital signals) fluctuates in the vicinity of unstable, or degrading, weather due to turbulence, water vapor, and cloud structure, and can therefore, with proper processing, herald the onset of weather events and the resultant loss of link quality. Losses due to evolving ionospheric effects can also be heralded in this manner. The signal-to-noise ratio is a measure of radio link loss or absorption. In the alternative, the measure of the absorption of the intervening medium can be used if available.

The time series of the absorption of the carrier demonstrates a high frequency structure 33 and generally trends upward preceding degradation of weather (at 34), and loses this structure 35 preceding improvement in weather and thus the radio link. Also note that the Fourier power increases at 36 well in advance of rain events 34.

Figure 4:
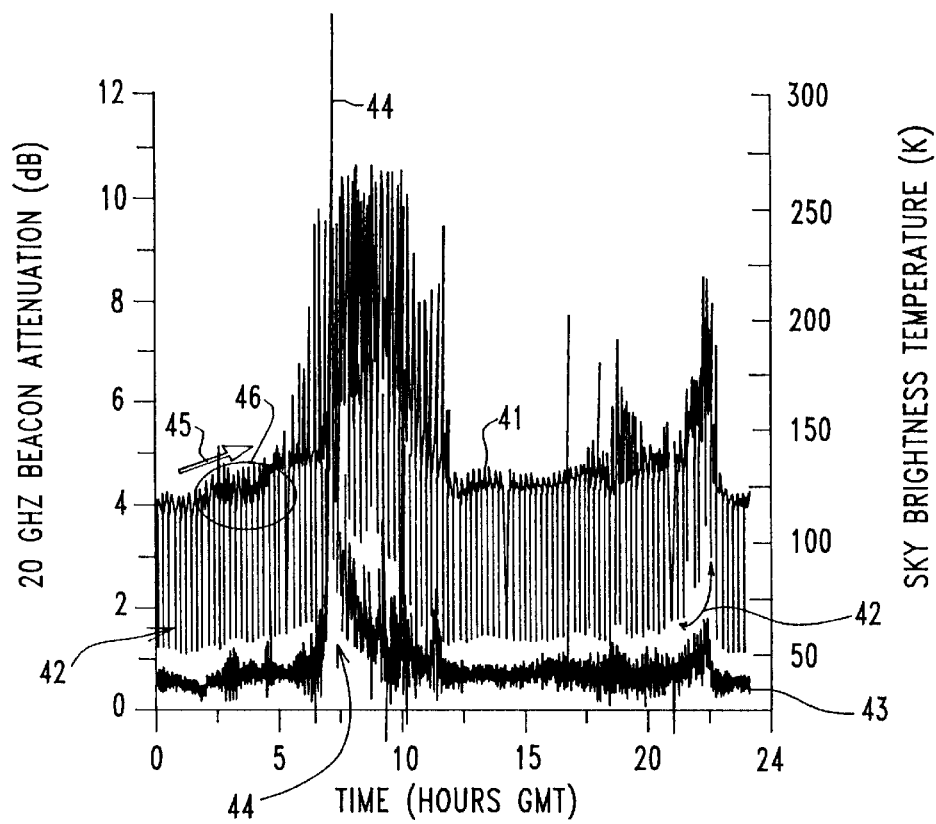
FIG. 4 is a time series of the power (called brightness temperature) received by a 24 GHz radiometer receiver that is being azimuthally scanned at a 15 degree elevation angle relative to concurrent satellite propagation path attenuation.

FIG. 4 is a more detailed time series 41 (and comparison with carrier attenuation data) of the sky microwave power received by a 24 GHz radiometer receiver that is being azimuthally scanned at a 15 degree elevation angle at a communication link base-site. The radiometer is also making an observation at a 40 degree elevation angle directly to the NASA ACTS satellite during each revolution, creating the periodic lower power measurements 42 because less atmosphere is being traversed at higher elevation angles. Also shown is the concurrent satellite propagation attenuation data 43. The high attenuation at 44 is preceded by an upward trend in radiometer brightness temperature 45 and a broadening of the azimuthally scanned time series 46. The upward trend is due to an increase in moisture in the field of view of the radiometer, and the broadening is due to a gradient across the sky in water vapor and/or cloud due to the encroachment in the near vicinity of the measurements of the water vapor and/or cloud.

Figure 5:
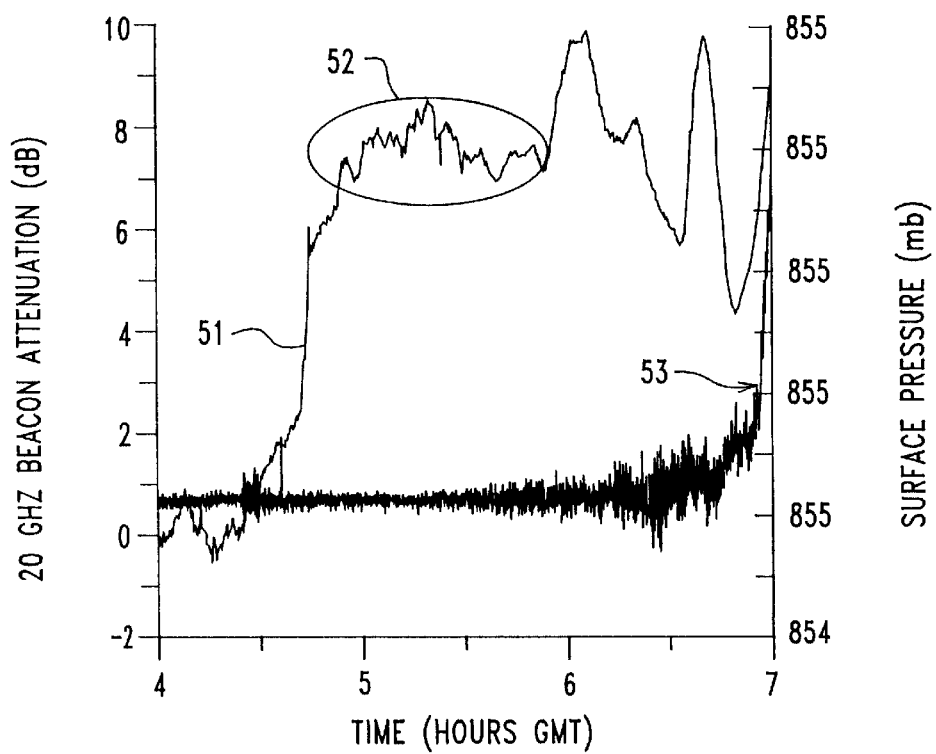
FIG. 5 shows surface barometric pressure relative to satellite propagation path attenuation.

FIG. 5 illustrates data of surface barometric pressure measurements taken at the base-site relative to the satellite propagation path attenuation. Trends in barometric pressure change (at 51) and acquired high frequency structure 52 are seen in advance of high attenuation event 53. Barometric pressure change is generally associated with a change in the weather, and the high frequency structure is often due to propagation of waves outward from weather-related atmospheric disturbances as discussed heretofore.

Figure 6:
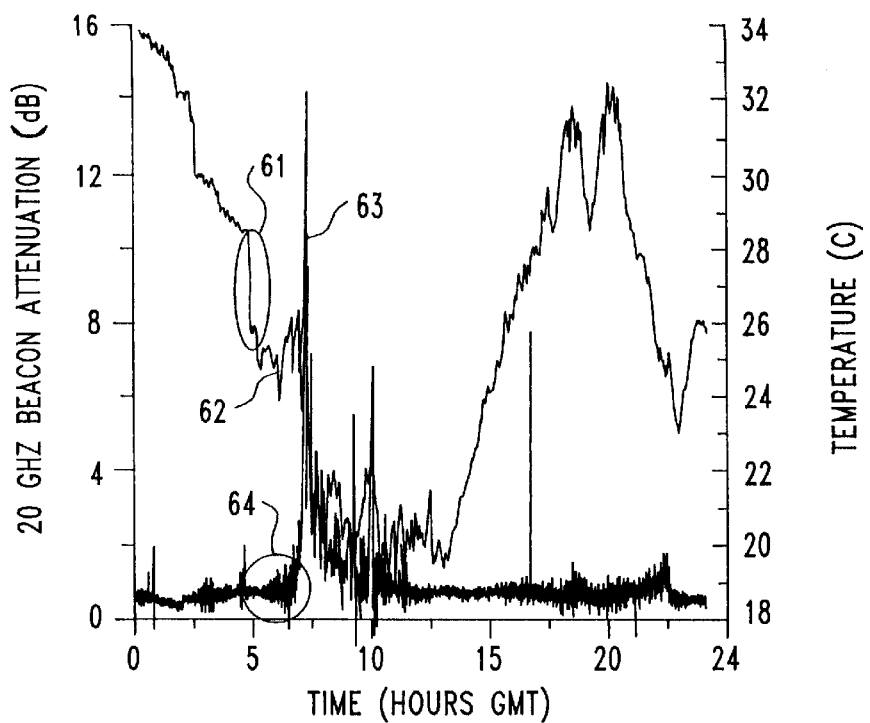
FIG. 6 is a time series of surface temperature showing change in trend relative to satellite propagation path attenuation.

FIG. 6 is a time series of base-site surface temperature showing change in trend 61 and temperature fluctuation 62 in advance of high carrier attenuation event 63. FIG. 6 also shows an increase in the high frequency component of absorption 64 of the 20 GHz satellite carrier in advance of the large attenuation event 63.

Figure 7A:
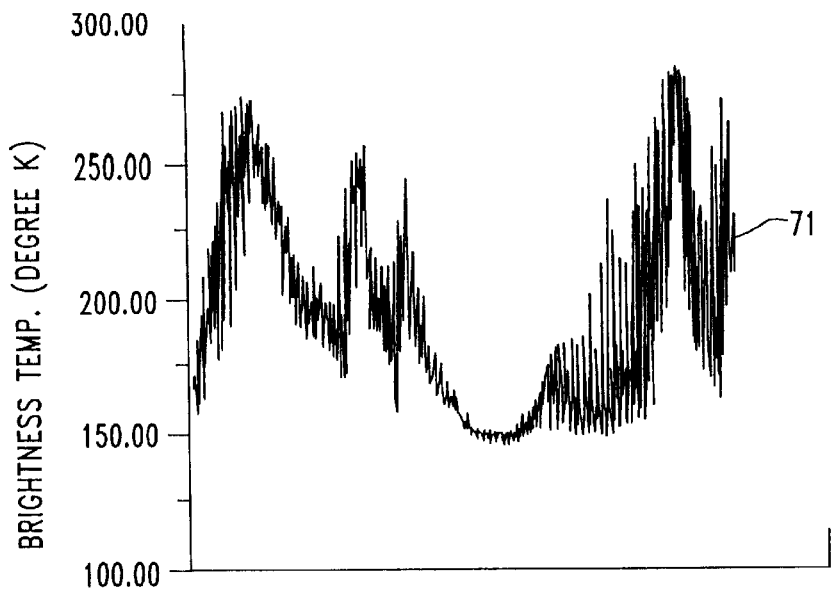
FIGS. 7a through 7c are time series of azimuthally scanned microwave radiometer brightness temperature measurement and derivable outputs.
Figure 7B:
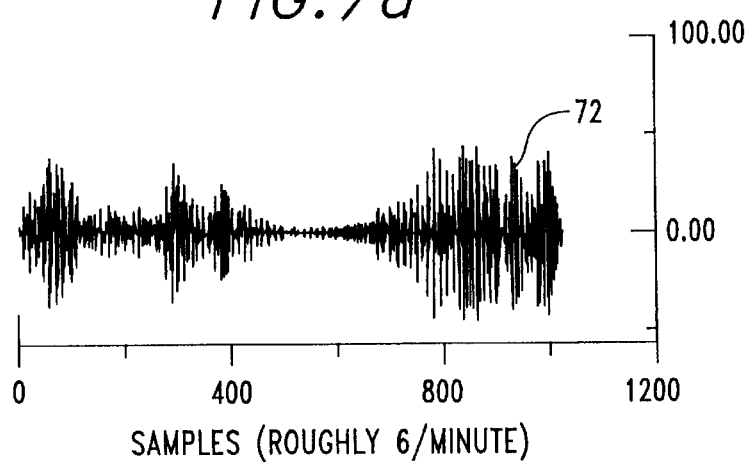
Figure 7C:
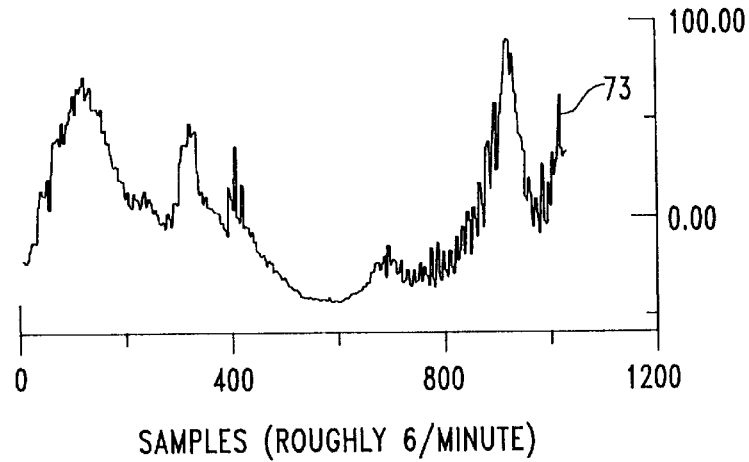

FIGS. 7a–c illustrate one of the data input types utilized by this invention, the azimuthally scanned microwave radiometer brightness temperature measurement, for the period of about one day (71 at FIG. 7a). FIGS. 7b and 7c show the data having been inverse wavelet transformed (as discussed hereinafter), and then transformed back into the time domain with the lower frequency half of the waveband octaves set to zero, thereby removing the undesired low frequency components and enhancing the high frequency components (as shown at 72 in FIG. 7b). This process extracts the sky gradient information from the azimuthally scanned radiometer data. Wavelet transformed data is shown at 73 (FIG. 7c) after transforming back into the time domain with the upper frequency three-fourths of the wavelet coefficients set to zero, thereby enhancing the low frequency, or trending, component of the radiometer data.

Figure 8:
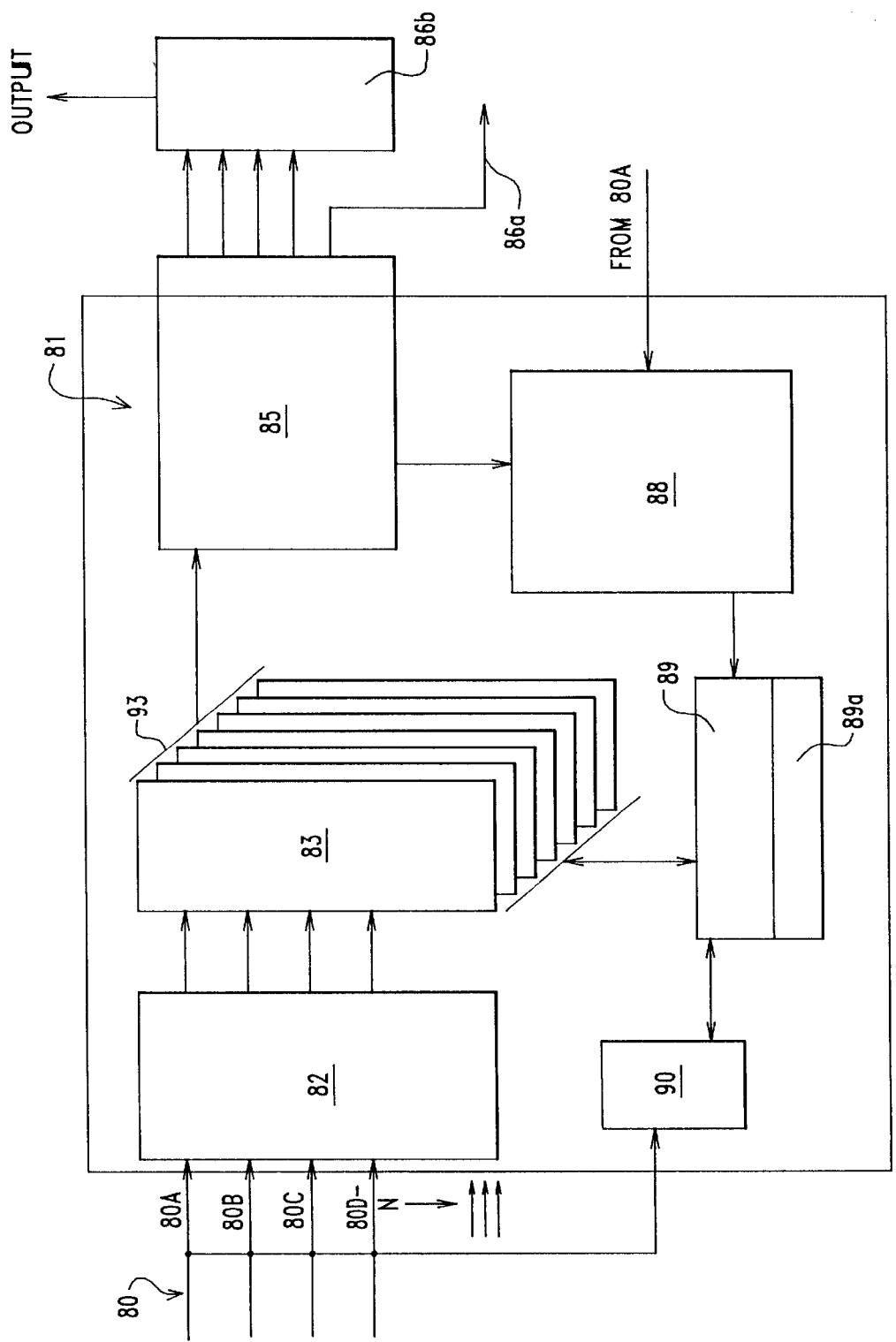
FIG. 8 is a functional block/process flow diagram of one embodiment of data manipulation structures and the propagation link quality forecasting apparatus of this invention.

FIG. 8 is a block diagram of the propagation link quality forecasting apparatus of this invention which utilizes the above-identified data signatures and observed relationships to carrier signal attenuation to derive link quality change forecasts. Raw data from the various selected observing sensor or sensors are input at 80 (utilizing hard wired inputs, ports, or by known remote transmission techniques) to processor 81 (a personal computer, for example). For example link attenuation (carrier propagation state) monitoring data relating the signal-to-noise ratio of the carrier is provided at input 80A, site-based scanning radiometer data at input 80B, site-based barometric pressure measurement data at input 80C, and site-based ground temperature and surface wind measurement data (and other selected, non-local, data if desired) at inputs 80D through 80N.

These indicia can be optionally conditioned at preprocessing stage 82 by any of a variety of methods including fitness (regression coefficients) standard deviation, slope and average techniques, any of a number of mathematical transforms (Fourier or wavelet, for example), and other filtering or processes that enhance selected data features (i.e., the signatures of value in the raw data) and suppress noise in the input data. Wavelet transforms are preferred for extraction of the trending features, turbulence and other structural features from the radiometer and other data which are then utilized as inputs to the system. The coal of the algorithm utilized is to produce a scalar value that can be used to discriminate between scintillations preceding high attenuation and non-attenuation events. For example, standard MATLAB software (from Math Works, Inc.) with WAVELAB (freeware available from Stanford University) library has been utilized at stage 82 in the now preferred embodiment of this invention to perform wavelet transform using Daubechies or Haar wavelets, with coefficients from the appropriate frequency domains (high frequency scintillations (1–10 seconds), intermediate frequency scintillations (10–30 seconds), and trending frequency (30–300 seconds) scales), to provide an enhanced output signal relating to the frequency domain of interest with reduced noise.

The preprocessed data are presented to a hardware or, as now utilized, software system stage 83 embodying a model of radio link performance (losses and recovery) as a function of the observable data types, or, preferably, a mathematical inversion system (as used herein, such system is defined to include systems and methods for performance of either or both mathematical inversion or function estimation techniques, this definition to be understood whenever this term is utilized hereinafter). The system may employ linear statistical retrieval methods, maximum likelihood methods, ANN methods (utilizing, for example, NEURAL WARE PROFESSIONAL II/PLUS by Neural Ware, Inc.) or the like. Output from system stage 83 (a numerical output in the range −1 to +1 in the case of an ANN) yields the desired prediction (i.e., characterizing future communication link performance) at signal output conditioning stage 85, which may be entirely resident in processor 81, entirely independent therefrom, or a combination thereof. If the prediction received at stage 85 is determined not to require warning or mitigation (based, for example, on determined thresholds, vectors, matrices or the like stored and updated in resident or processor memory) no corrective or warning outputs are generated. If warning, adaptation or mitigation is indicated by the prediction, conversion of the output from stage 83 to engineering units or signals utilizable by mitigation or warning systems employed occurs at stage 85, and a warning output signal is generated on alarm output channel 86a and/or mitigation signals are output to transceiver system 86b.

Transceiver system 86b communicates adaptive measures to be taken in response to received mitigation signals at the propagation link. Such warning, adaptation and/or mitigation can be a simple advance notice of short-term propagation link quality change, or active system adaptation and control by automatically changing transmit power, receiver gain, changing digital bit rate, changing antenna or satellite location, changing carrier frequency, antenna gain and point, or other such known methods.

The mathematical inversion system is conditioned or "trained" by comparing predicted results with actual results (at stage 88). For example, the state of the predictive data can be linearly regressed (from stage 89 as discussed hereinafter) at stage 83 of processor 81 to the propagation link state at the desired subsequent interval for a large number of cases, yielding a relationship between the predictive data and subsequent propagation state (from input 80A). ANNs can be "back-propagated" to train the ANN as discussed hereinafter.

The system can be made adaptive in that it can self-train to accommodate seasonal or climatic drift, change in sensor sensitivity, accuracy, or noise, loss of a data or data input 80, or other deficiencies in the hardware system or processing method. This could be accomplished by comparing the predicted condition with the subsequent actual condition at comparing stage 88, and then updating the model or mathematical inversion system training stage 89.

Comparing stage 88 (including means for short term delay of the conditioned prediction signal received from stage 85, such as buffer memory or delay line technique) includes an input from 80A providing link attenuation monitoring data. The prediction signal is then compared to the real time state of the data link, and an output (indicative of a numerical error) is provided to training stage 89. Training stage 89 is provided access to memory 89a containing initial training history and read/write access to buffer memory 90 (for example a 24 hour circular buffer) containing recent data indicative of the inputs from sensors at inputs 80. The error signal can be utilized at stage 89 continually for ongoing training at stage 83 or periodically (as needed) for extensive retraining as set forth hereinafter.

Figure 9:
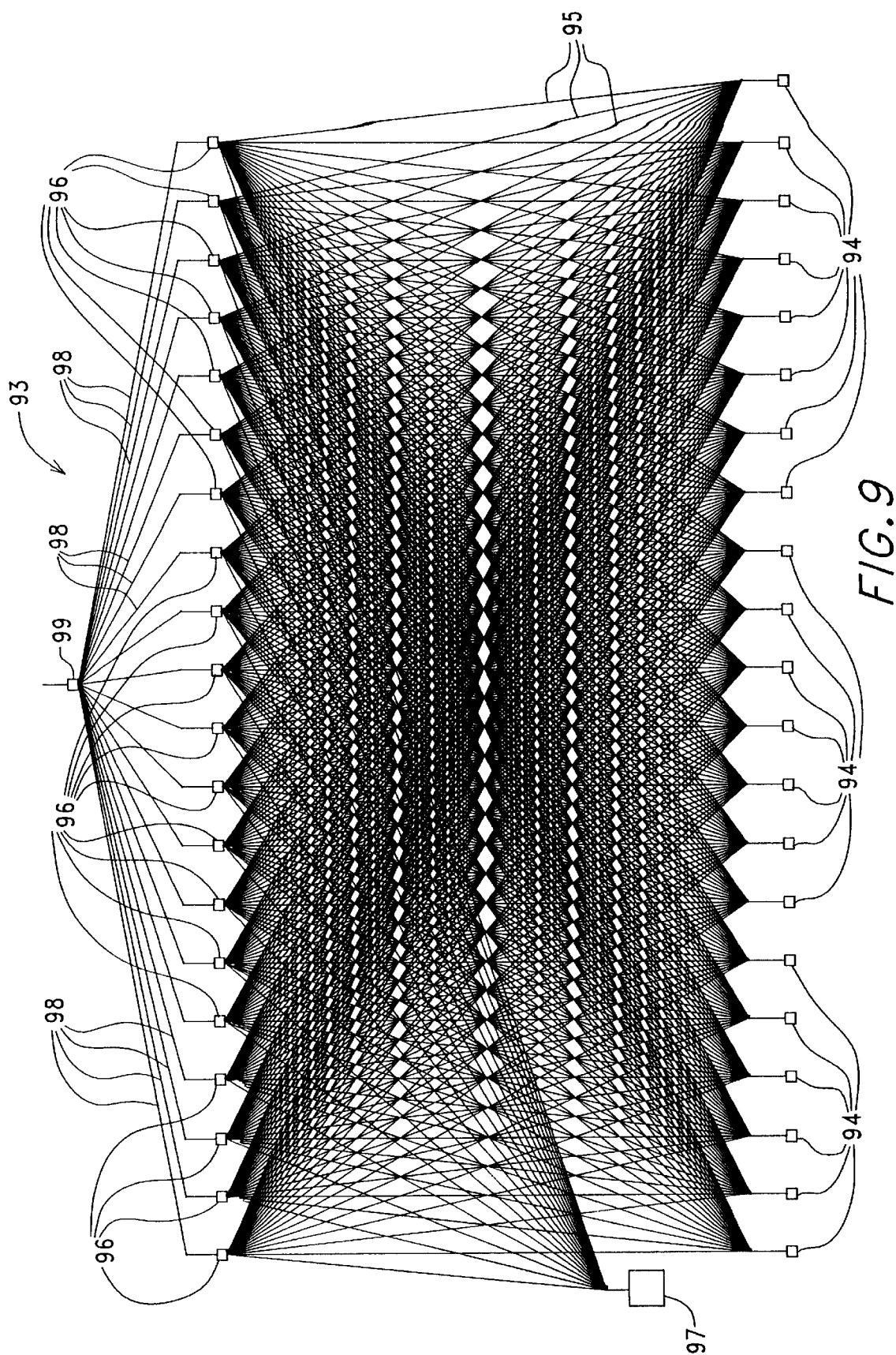
FIG. 9 is a depiction of an artificial neural network (ANN) structure receiving a number of observed data types.

FIG. 9 is a depiction of an artificial neural network (ANN) 93 (one preferred embodiment of a mathematical inversion system for use at stage 83) wherein a number of observed data types are presented to a first layer of input nodes, or processing elements, 94 with the weighted responses to these inputs conducted (at 95) to a hidden layer of nodes, or processing elements, 96 that may be biased in their responses from input 97. The weighted responses of these hidden nodes are then conducted (at 98) to the output node 99 (providing the predictive output/numerical value).

By way of example, seven ANN's 93 (as illustrated in FIG. 8, it being understood that as few as one ANN, or as many as desired, could as well be utilized) could be used at stage 83 to provide output utilized in predicting link attenuation at specific times in advance (a temporal spectrum, for example one ANN 93 each for 1, 2, 3, 4, 5, 10 and 15 minute advance predictions). All ANN's 93 are initially trained from data samples including historical predictive data corresponding with the desired inputs to be utilized, binary or analog, and known historical resultant link attenuation resulting therefrom at the relevant prediction period.

Such data samples are extracted over some relevant prior data collection period (for example, as little as one month providing 2,000 samples may be adequate), the initial training data being save in memory 89a. Training utilizing such historical data results in iterative ANN output refinement (node weighting adjustment) by a selected learning rule, or coefficient (any number are known to those skilled in the art and could be utilized), and based upon a comparison of a "correct" network response to the predictive input data with the actual iterative responses. The error obtained by each successive comparison is used at the ANN to adjust weights at the ANN nodes, thus reducing system error (as is known).

In the case as illustrated in FIG. 9, 21 input nodes 94 for receiving link attenuation, surface meteorological, and radiometric data as shown in Table 1, one or two hidden layers 96 of 40 nodes each, and an output layer 99 of one node yielding the predictive output has been provided. All nodes use a sigmoidal transfer function with standard back propagation learning strategy. Training is used continuously and/or periodically to further reduce noise (for example, at intervals of 100,000 epochs).

Such an architecture selectively provides short-term (0+ to 15 minutes) advance warning of signal attenuation events, with greater predictive accuracy closer in time to the event. For example, using only a single data input (carrier signal-to-noise data at input 80A) to processor 81, predictions five minutes in advance of 6 dB communication link signal falloff and/or recovery are possible, with increased predictive capability and accuracy possible using two data inputs (adding a local radiometer at input 80B, for example), and even greater capability and accuracy achievements as the ensemble of local meteorological input data is increased.

TABLE 1

| Observable | hi-freq scintillations | mid-freq scintillations | trending |
| --- | --- | --- | --- |
| Eb/No | 1–10 sec | 10–30 sec | 30–300 sec (upward) |
| radiometer | each cycle (each 2 obs.) | 2–60 min | 1–3 hours (upward) |
| barometer | 10–300 s | 5–30 min | 0.5–6 h |
| sfc. temperature | 1–5 min | 5–180 min | |
| sfc. humidity | 1–5 min (upward) | 5–180 min (upward) | |
| sfc. winds direction | 10 sec | 5 minute average | |
| speed | 10 sec | 5 minute average | |
| Time of Day | N/A | | |
| Day of Year | N/A | | |

Figure 10:
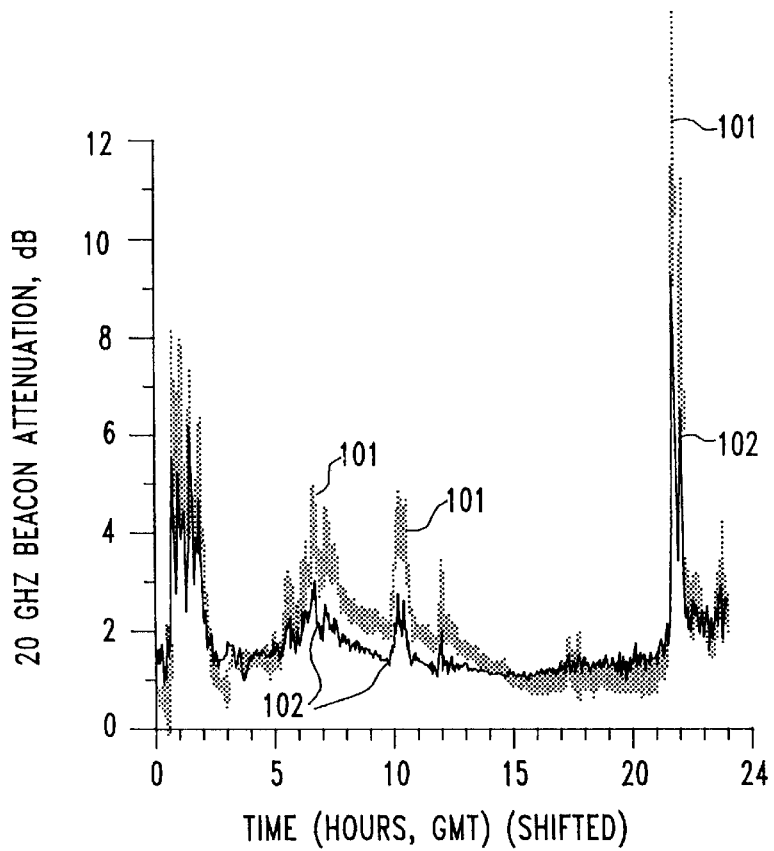
FIG. 10 illustrates predictive capability of this invention utilizing only scanning radiometer and satellite carrier signal-to-noise ratio input data.

FIG. 10 demonstrates the capability of a predictive system as shown in FIGS. 8 and 9 utilizing scanning radiometer data input at 80B and satellite carrier signal-to-noise ratio data at input 80A that have been wavelet transformed at preprocessing stage 82 to enhance desired predictive features. These data are then presented to a selected ANN or ANNs 93 at system stage 83 that has been previously trained as discussed above. Actual carrier attenuation (at 101) is predicted 10 minutes in advance by the output of conditioning stage 85 (at 102 in FIG. 10, the predicted attenuation data having been shifted 10 minutes to the right in the FIGURE to provide a more direct comparison of predictors 102 with the subsequent actual attenuation events 101).

Raw input data that has been filtered at preprocessing stage 82 to enhance the features of interest, and remove features with no information content relative to predicting radio link quality, provides improved accuracy and resolution of the link quality forecasting system over utilization of unfiltered input data. Such preprocessing also enables the system to more quickly train in system start-up, and makes adaptive training more prompt and accurate.

The data could, optionally, be processed in real time to enhance signal behavior on the scale of the time domain of interest. For instance, predictive barometric pressure and temperature trends are on the scale of hours, whereas pressure and radio carrier scintillations due to atmospheric turbulence and structure are on the scale of minutes and of seconds. Radiometer signal changes on the scale of hours and on the scale of minutes are precursors of weather events, as are azimuthal variations and anisotropies.

The above referenced locally measured or gathered input data relating to evolving vicinal atmospheric conditions could also be supplemented by more regionally gathered input data to processor 81 such as satellite imagery of water vapor and cloud fields, radar data, and other weather related data types from non-local sources to thereby further refine predictive capability and extend prediction duration.

Specific embodiments of this invention may selectively utilize different data inputs. Such input sources include signal-to-noise (Eb/No) monitoring information from the NASA Advanced Communications Technology Satellite (ACTS) and site-based measuring devices including a precision barometer, surface wind anemometer, surface thermometer, and radiometer scanning its field of view at an angle 15 degrees above the horizon at the base-site, all providing data at inputs 80.

The signal-to-noise (Eb/No) of the satellite carrier (available, for example, from the NASA ACTS) containing data signature predictive indicia in trending information and the high frequency scintillations (rapid signal fluctuations on the scale of a few seconds to tens of seconds, and typically associated with fluctuations in the index of refraction produced by turbulence) is input at 80A of processor 81. This input data is preferably wavelet transformed at preprocessing stage 82 to extract the trending and high frequency information, and these transformed data are preferably presented to one or more ANNs 93 at stage 83. This input indicia has been found to provide data that is a reliable precursor to unstable weather, cloudiness and rain events in the vicinity of the communication link (and thus corresponding to observed related high attenuation events requiring at least some form of remediation if communication link carrier signal loss is to be prevented).

While such carrier scintillations are useful predictors of impending signal falloff, they do not always accurately estimate the delay time between prediction and falloff or the magnitude of the attenuation event. Thus additional input data is desirable.

While any of a variety of local meteorological measuring devises could be utilized, the following will illustrate those found useful heretofore. A VAISALA PTB200 precision barometer is capable of resolution of about 0.005 millibar and sample intervals of one second. The pressure port of this barometer is connected to QUALIMETRICS M104598 QUADDISK static port that can give highly accurate measurements of ambient pressure in the presence of high winds. Data from this barometric sensor are collected over an RS232 link (at input 80C) to processor 81. Wavelet transforms are preferably utilized to extract, or enhance, the acoustic and buoyancy wave features and long term trends of interest in the data, which are then utilized as inputs to the ANN.

A YOUNG Model 09101 wind anemometer is capable of resolution of 0.1 meter/second and 1 degree of azimuth direction. The wind vector data from this anemometer input at one of inputs 80D–N to processor 81 are averaged over 1 minute intervals, and vector dot product and vector wedge (outer) product are calculated and scaled at preprocessing stage 82 (the vector dot product is a measure of the strength and persistence of wind, while the vector wedge product is a measure of strength and variability).

The thermometer utilized at one of inputs 80D–N may be an ANALOG DEVICES AD592, resolute to better than 0.1C. Wavelet transforms are utilized to extract, or enhance, the trending and turbulence related features of interest.

Figure 11:
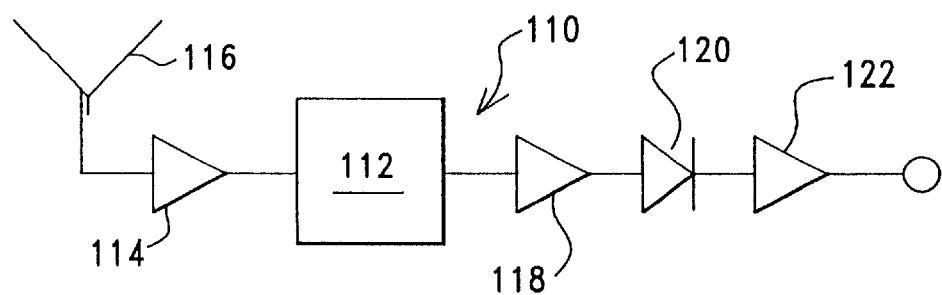
FIG. 11 is a block/schematic illustration of a simplified and inexpensive monolithic microwave integrated circuits (MMIC) based radiometer in accord with another aspect of this invention.

A microwave radiometer useful for data input at 80B of the apparatus of this invention could utilize any heretofore known design (integrated circuit, total power, Dicke switched, autocorrelation, noise adding, or the like) and be provided with a receiver of a number of constructions, including downconverter or direct detection filterbank types. The radiometer may be constructed utilizing a wave-guide based, or monolithic microwave integrated circuit, receiver. However, an greatly simplified, inexpensive but highly accurate microwave radiometer 110 for utilization in the apparatus of this invention is illustrated in FIG. 11.

Preferably, and in accord with another aspect of this invention, the receiver is constructed of an off the shelf telecommunications transceiver 112, for example an END-GATE SYRAH 38 telecommunications transceiver operated at 39 GHz. The transmitter of transceiver 112 is muted (by a serial shut-off command), and a low noise amplifier (LNA) 114 (for example a MITEQ 39 GHz 27 dB gain) is connected between feed horn antenna system 116 and the antenna port of transceiver 112.

The noise figure of LNA 114 should be less than 3 dB, giving receiver 112 an overall radiometer noise figure of less than 3 dB. The input port of LNA 114 is connected to feed horn antenna system 116 that can be directed to all azimuth and elevation angles (as hereinafter set forth). The intermediate frequency (IF) output of receiver 112 is amplified at amplifier 118, and then detected, utilizing, for example, Schottky tunnel diode 120. The output is amplified again at amplifier 122 to obtain the desired D.C. output.

The overall amplification between antenna system 116 and detector diode 120 is maintained so that, in response, detector diode 120 is, preferably, operated in a linear portion of its voltage out vs. power. Such operation ensures that changes in final output voltage of radiometer 110 are directly proportional to changes in power received from the sky, thus simplifying interpretation of the radiometer output.

Figure 12:
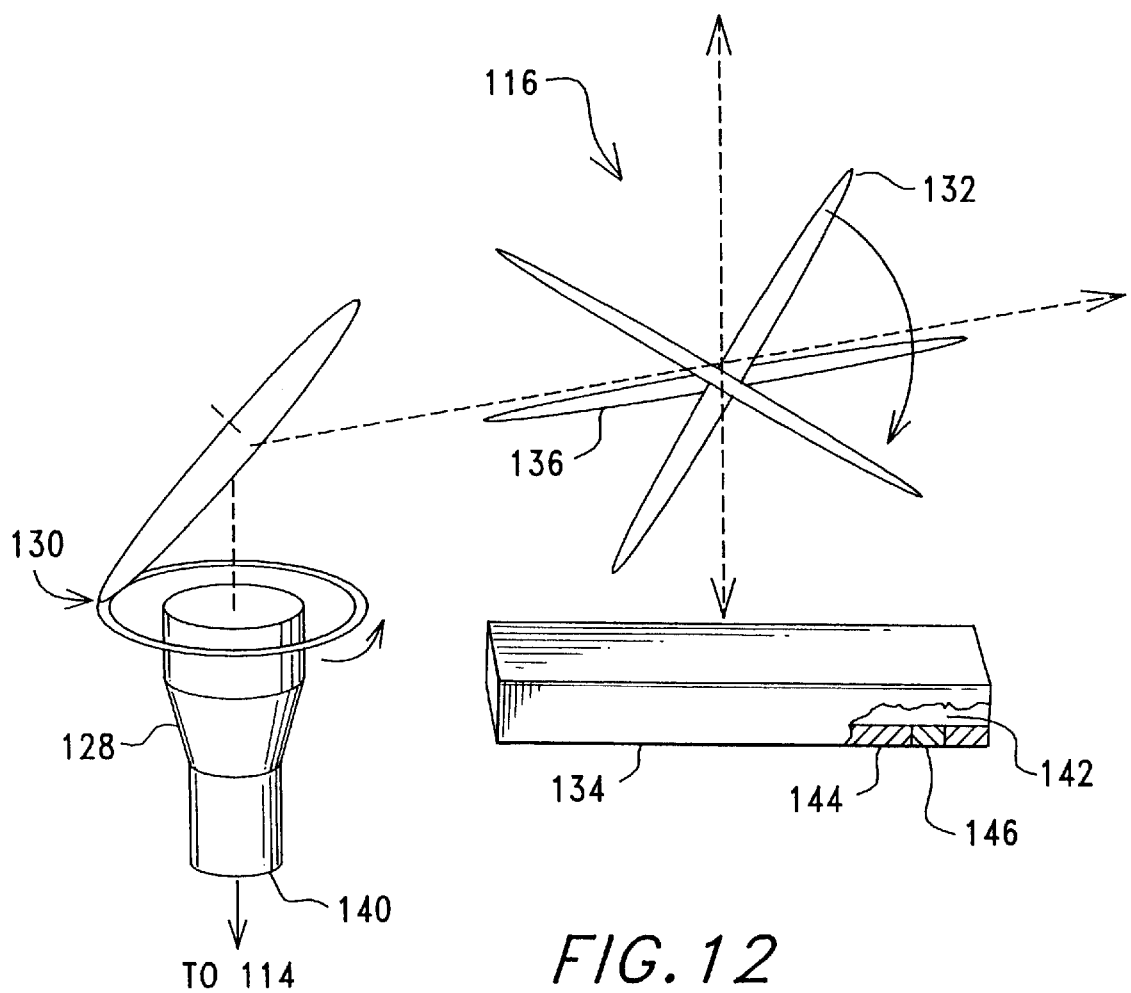
FIG. 12 illustrates a currently preferred embodiment of an antenna system in accord with this invention.

The feed horn antenna system 116 (FIG. 12) consists of a dual mode feed horn 128 and an azimuthally steered reflector 130 to direct the field of view of the radiometer to any azimuth angle. Azimuth reflector 130 is an off-axis paraboloid to diminish antenna beamwidth, with the electrical phase center of the feed horn at the focus. An elevation reflector on a horizontal axis 132 is provided to direct the field of view of the radiometer to various elevation angles. This allows the radiometer field of view to be directed to any azimuth direction in the sky as well as to the nadir direction to a blackbody reference target 134. The elevation reflector is thin and can be turned edge-on (as seen at 136) to the radiometer to remove it from the field of view. Dual mode feed horn 128 diminishes side lobes by allowing a mixture of the $TE_{11}$ and $TM_{11}$ mode as well as the fundamental $TE_{11}$ mode to propagate in the first diameter (at 138). The $TE_{11}$ and $TM_{11}$ modes cancel near the wall of the feed horn, diminishing surface currents in the horn, which diminishes diffraction at the aperture, thereby diminishing side lobes. The small diameter (at 140) propagates only the $TE_{11}$ mode to the radiometer receiver as is desired.

The blackbody consists of absorbing foam 142 with a gradient in permittivity increasing from the top surface downward to reduce reflections from its surface. The foam is attached to thermally conductive metal plate 144 to ensure a uniform temperature across the foam. Temperature sensors 146 monitor the temperature of the plate. This entire assembly is embedded in a dielectric foam (not shown) that is transparent to microwaves and acts as a thermal insulator to slow temperature changes in the blackbody due to changes in ambient temperature. This blackbody serves as a calibration reference.

The radiometer gain and offset can be calibrated by directing the field of view of the radiometer to several elevation angles under stratified skies. Because the atmosphere is translucent at 39 GHz, the amount of atmosphere, and therefore the amount of sky signal, is approximately proportional to unity divided by the sine of the elevation angle. Various levels of signal whose relative proportions are known can therefore be observed at these various elevation angles, enabling calibration of the radiometer receiver.

As may be appreciated from the foregoing, the apparatus of this invention operates to respond to wireless communication link quality change predictive indicia contained in various monitored or sensed input data. Some of these data are preferably wavelet transformed utilizing a Daubechies or Haar transform, and the transformed data on the time scale of one minute to 180 minutes are retained.

In apparatus utilizing an ANN that is trained by back propagation, the transformed data are applied to an input layer, values are forward propagated through intermediate hidden layers and output layers. An error value is computed as the difference between the actual signal-to-noise data that is time delayed by the desired interval of prediction (0+ to 15 minutes, for example) and the forward propagated value. The error is back propagated through the ANN to improve prediction accuracy. Each ANN node's connection weights are updated according to its proportional contribution to the error.

Once thus trained, real time data are wavelet transformed as above and forward propagated through the ANN, yielding a prediction of the radio link quality. This prediction is then used to automatically control the transmit power of transceivers at both ends of a radio link, or to otherwise adapt the communication link to the predicted link quality change.

While desirable, preprocessing is not necessary to this invention, as, for instance, artificial neural networks (ANNs) are extremely flexible in the structure of the input data and can, with sufficient training, extract information contained in most any signal.

The predictive system can be adaptive in that the data can be utilized on a continuous basis to train and refine the ANN as discussed above. Periodically, however, more radical retraining may be indicated. For example (referring to FIG. 8), where random sampling (for example, 1 second of each hour) of predictive data and input data maintained in buffer memory 90 reveals significant and/or ongoing predictive error (in excess of a selected threshold or thresholds, for example), ANN retraining utilizing the initial training history stored in memory 89*a* as well as the data maintained in the buffer memory may be automatically initiated by training stage 89.

Moreover, the system can be adaptive to climatic and seasonal changes, site dependence, loss of elements of the sensor system, radio link component degradation, and other system and environment changes by continuous self-monitoring, self-training, and corrective output as data are assimilated. For example, in the case of a degraded or nonfunctional sensor, periodic comparison at stage 89 of sensory data held in buffer memory 90 would indicate a sensor that is operating outside of set expectations. In such case, a "bad sensor" alarm could be initiated to an on site operator, or the bad sensor could be eliminated from the system by initiation at stage 89 of a command to prune the relevant input nodes from ANN 93 and initiate a retraining cycle.

The predictive system will communicate and command changes to adapt the communications link in view of predicted likely link quality degradation (or, conversely, likely return to link quality normalcy) at the site. Alternatively, the system may merely provide advance notice to site operators of likely link quality in view of evolving vicinal atmospheric conditions.

Thus it may be seen that utilization of the apparatus and methods of this invention enables short-term forecasting of wireless communication link quality changes so that the likelihood of communication link disruption or significant signal loss can be anticipated and readily mitigated. Moreover, improvement in signal quality after remediation can also be predicted and accommodated. The apparatus and methods of this invention can be readily implemented with a personal computer utilizing known software and/or hardware, and are flexible and resilient to changing environment. The apparatus forecasts likely wireless communication link quality changes due to atmospheric conditions including events likely to evolve in the vicinity of the communication link in the short-term down to and less than 15 minutes from forecasting.

What is claimed is:

1. A method for short-term forecasting of quality changes of a wireless communication link comprising:

receiving indicia indicative of selected evolving vicinal atmospheric conditions;

processing said indicia to derive short-term link quality change prediction based at least in part on selected utilization of past communication link performance, processing including preprocessing said indicia to enhance data features of interest in said received indicia and processing said indicia utilizing a mathematical inversion method to derive said prediction of short-term link quality change from said enhanced data features, wherein preprocessing said indicia includes performing a wavelet transform on said received indicia, said wavelet transform selected to produce a scalar value utilized to discriminate atmospheric scintillations preceding changes in quality of a wireless communication link as said data features; and utilizing said prediction remedially.

2. The method of claim 1 wherein utilizing said mathematical inversion method includes utilizing an artificial neural network.

3. The method of claim 1 wherein said mathematical inversion method includes training and adaptation by comparing said prediction, said indicia and/or wireless communication link performance data.

4. The method of claim 1 wherein the step of utilizing said prediction remedially includes adapting the communication link in view of said prediction.

5. The method of claim 1 further comprising measuring, at a base site of the communication link, selected atmospheric conditions at said base site and providing measurements as said indicia.

6. The method of claim 1 further comprising monitoring communication link carrier signal-to-noise ratio and providing monitoring data as said indicia.

7. The method of claim 1 further comprising gathering selected atmospheric data using a microwave radiometer at a base site of the communication link and providing said data as said indicia.

8. The method of claim 1 wherein said short-term link quality change includes events likely to evolve down to and less than 15 minutes from said prediction.

9. Apparatus for forecasting likely wireless communication link quality changes due to atmospheric conditions and responding to a predicted quality change in sufficient time to allow communication link adaptation, the atmospheric conditions including events likely to evolve in the vicinity of the communication link in the short-term down to and less than 15 minutes from forecasting, said apparatus comprising:

input means for providing data indicative of atmospheric conditions, said data including at least one of measured communication link attenuation, barometric measurements taken in the vicinity of the communication link, surface wind measurements taken in the vicinity of the communication link, air temperature measurements taken in the vicinity of the communication link, and atmospheric microwave power emission measurements taken in the vicinity of the communication link;

processing means for receiving said data and including a preprocessing stage enhancing data features of interest in said data received from said input means and a processing stage to extract prediction of short-term link quality change from said enhanced data; and output means for receiving said prediction from said processing means to thereby accommodate initiation of communication link remediation measures when required.

10. The apparatus of claim 9 wherein said processing stage includes an artificial neural network utilizing a back propagation learning strategy.

11. The apparatus of claim 9 wherein said input means includes a plurality of inputs each providing data indicative of atmospheric or ionospheric conditions, said data at said inputs including at least measured communication link attenuation and atmospheric microwave power emission measurements taken in the vicinity of the communication link.

12. The apparatus of claim 11 wherein said preprocessing stage includes means for wavelet transform of said data to enhance said data features.

13. The apparatus of claim 9 wherein said input means includes a microwave radiometer for monitoring atmospheric propagation conditions in the vicinity of the communication link and providing atmospheric microwave emissions data as and output therefrom to said processing means.

14. The apparatus of claim 13 wherein said microwave radiometer is a waveguide-based microwave integrated circuit radiometer.

15. The apparatus of claim 13 wherein said radiometer is a monolithic microwave integrated circuit radiometer.

16. The apparatus of claim 15 wherein said monolithic microwave integrated circuit radiometer has a muted transmitter.

17. A method for short-term forecasting of quality changes of a wireless communication link comprising:

receiving indicia indicative of selected evolving vicinal atmospheric conditions;

processing said indicia to derive short-term link quality change prediction based at least in part on selected utilization of past communication link performance, wherein said short-term link quality change includes events likely to evolve down to and less than 15 minutes from said prediction; and utilizing said prediction remedially.

18. The method of claim 17 further comprising monitoring selected ones of communication link attenuation, barometric pressure in the vicinity of the communication link, surface winds in the vicinity of the communication link, air temperature in the vicinity of the communication link, and atmospheric microwave power emissions in the vicinity of the communication link and providing monitoring data as said indicia.

19. The method of claim 17 wherein the step of processing includes preprocessing said indicia to enhance data features of interest in said received indicia and processing said indicia utilizing a mathematical inversion method to derive said prediction of short-term link quality change from said enhanced data features.

20. The method of claim 17 wherein said processing step includes deriving either impending signal degradation or impending signal improvement as said quality change prediction.

21. The method of claim 17 wherein said selected evolving vicinal atmospheric conditions include selected ones of observable meteorological conditions in the near vicinity of said communication link and evolving ionospheric effects in the near vicinity of said communication link.

22. The method of claim 17 wherein said selected utilization of past communication link performance includes one of data modeling, back propagation training, and linear regression training.

23. The method of claim 17 wherein said selected utilization of past communication link performance is ongoing to thereby provide continued adaptation to seasonal and sensory changes reflected by said indicia received and further refine said prediction.

24. The method of claim 17 wherein said processing step includes utilizing artificial neural network methods to provide a spectrum of temporal link quality change predictions.

25. The method of claim 17 wherein said indicia includes at least one of data trends and high frequency fluctuations in selected input data.

26. A monolithic microwave integrated (circuit radiometer receiver comprising:

an antenna;

a monolithic microwave integrated circuit transceiver connected with said antenna and configured with a muted transmitter, said transceiver having an intermediate frequency output;

a detector diode connected with said output of said transceiver; and amplification means for signal amplification at selected stages between said antenna and said diode, said amplification means providing total amplification between said antenna and said diode selected so that, in response, output voltage changes at said diode are proportional to sky emission power changes received at said antenna.

* * * * *